Feb. 18, 1958   A. C. PETERSON   2,823,875
CONVERTIBLE AIRCRAFT WITH JET-DRIVEN LIFTING ROTORS
Filed June 24, 1955   4 Sheets-Sheet 1

INVENTOR.
Adolphe C. Peterson

Feb. 18, 1958  A. C. PETERSON  2,823,875
CONVERTIBLE AIRCRAFT WITH JET-DRIVEN LIFTING ROTORS
Filed June 24, 1955  4 Sheets-Sheet 2

INVENTOR.
Adolphe C. Peterson.

Feb. 18, 1958  A. C. PETERSON  2,823,875
CONVERTIBLE AIRCRAFT WITH JET-DRIVEN LIFTING ROTORS
Filed June 24, 1955  4 Sheets-Sheet 3

INVENTOR.
Adolphe C. Peterson.

Feb. 18, 1958 A. C. PETERSON 2,823,875
CONVERTIBLE AIRCRAFT WITH JET-DRIVEN LIFTING ROTORS
Filed June 24, 1955 4 Sheets-Sheet 4

INVENTOR.
Adolphe Peterson.

United States Patent Office 2,823,875
Patented Feb. 18, 1958

2,823,875

CONVERTIBLE AIRCRAFT WITH JET-DRIVEN LIFTING ROTORS

Adolphe C. Peterson, Edina, Minn.

Application June 24, 1955, Serial No. 517,708

21 Claims. (Cl. 244—17.25)

My invention relates to aircraft of the type which are convertible for either horizontal translational flight or for rotor type flight, and it is therefore called aircraft for rotor or wing flight.

The chief objects of my invention are to provide a practicable form of convertible aircraft which is readily convertible to fixed wing flight or to rotor sustained flight, and which will embody such advantage while yet having advantages, in such alternative type use, such as relative simplicity in construction, and economy in use of fuel, and economy in construction of the aircraft. Aircraft of such types which are known are not usually of a type which is utilizable for ordinary commercial use because they have not a system of use of airfoil surfaces, which results in efficiency in each type of flight, and it is an especial object of this invention, to provide a construction which has an adequate degree of efficiency in either use as an aircraft, since each type of use is procured by an arrangement of the air foil surfaces which results in adequate efficiency for each type of sustentation. This aircraft especially has an improved efficiency in the cruising or translational flight, since by its construction, there is not an interference with the air stream flight over the wing surface, and because the device is then streamlined for efficiency in such flight. On the other hand, in hovering flight, or slow descent or ascent, this aircraft has such efficient use of the rotor surface that efficiency in that type of sustentation is achieved.

In general the object is to improve upon the means for procuring aircraft for fast translational flight, with the added capacity in the aircraft for slow flight or hovering flight, or vertical ascent or descent without fast horizontal movement. The principal devices and combinations of devices comprising my invention, are as hereinafter described and as defined in the claims. In the accompanying drawings which illustrate my invention, like characters refer to like parts throughout the views, in so far as practicable. Referring to the drawings:

Figure 1 is a view chiefly of a section, partially through the axis of one unit such as my invention, and this view shows the section appearing to the left of the axis of the rotor of the unit, and the portion of the section to the right of that axis.

Figures 8 and 9 are diagrammatic views on a relatively much smaller scale, of a pair of units such as my unit, and an associated fuselage assemblage with the two units, this illustration showing merely one manner of mounting such units, as my device, on a fuselage construction, or hull construction, it being contemplated that such units may be mounted in any number on an aircraft and in various locations and associations thereon. Of these views, Figure 8 is a plan view and Figure 9 is a side elevation of the aircraft.

Figures 13 and 14 are views of a modified form of bearing means and also drive for the rotor unit, and of these

Figures 1, 3, 4, 5, 7:
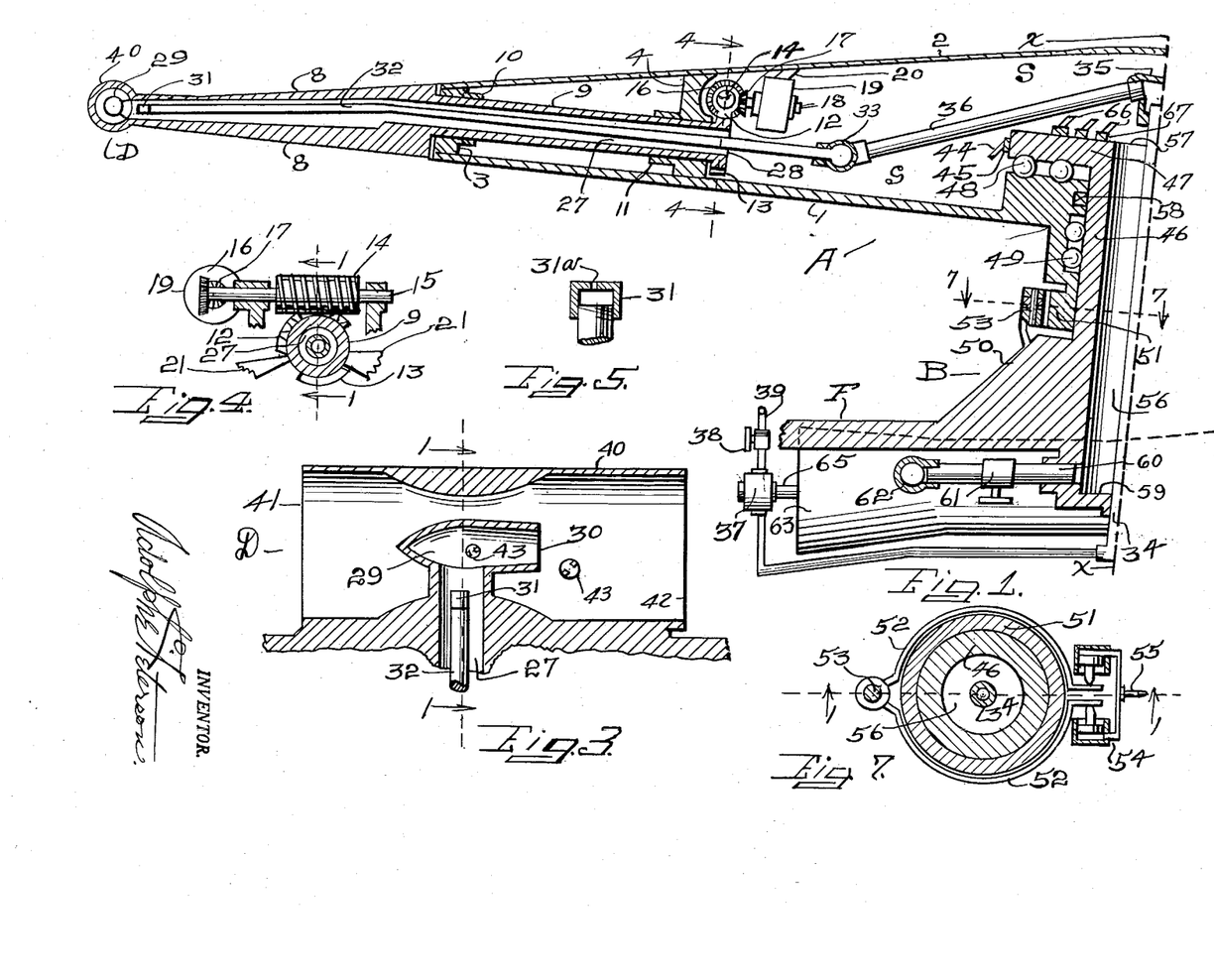
Figure 1, is not shown but it should be understood that this rightward portion is substantially similar as to the rotor itself, the associated turbine unit being somewhat different rightwardly of this axis. This view shows some parts in full side elevation, and shows some elements broken away, and the section is taken on a vertical plane on the lines 1—1 of Figures 2, 3, 4, 7, and 8.
Figure 3 is a detail view on a much enlarged scale, of one propulsion jet of the unit, there being eight of these shown in the plan view, Figure 2.
Figure 4 is a detail section through one airfoil oscillative control drive there being eight of these shown diagrammatically only in Figure 2, this section through the one control drive being on the line 4—4 of Figure 1.
Figure 5 is a detail showing of one fuel metering nozzle means, of which there are eight in the unit as described, the section being through the metering aperture of the nozzle.
Figure 7 is a detail section on a nearly horizontal plane on the line 7—7 of Figure 1, to show the brake shoes and operating means, the brake shoes being shown in plan view, the other elements in section, with the exception of the hydraulic brake actuating pistons.
Figure 8:
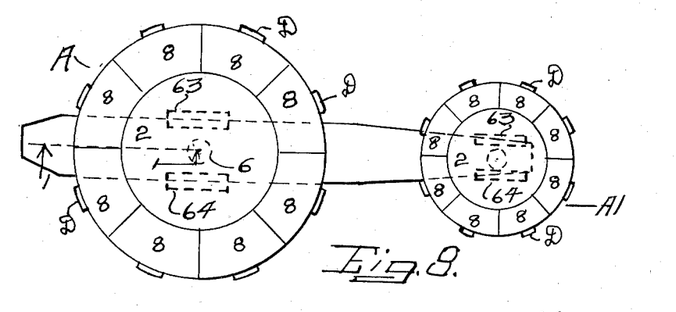

Referring first to Figures 1 to 7, both inclusive, which illustrate one rotor unit, such as my invention comprises, there is there shown, the units and elements which comprise the operative rotor unit, and including generally, the rotor designated generally as A, the mounting designated as B, two turbines designated as 63, 64—one only shown in Fig. 1 and both shown in Fig. 8—and propulsion jets designated generally as D.

The rotor A consists of major parts, and which are: a circular airfoil (otherwise called a wing) which has a lower relatively flat surface wall 1 which is circular in form, an upper surface wall 2 which is circular in form but is shaped as an inverted dish of very shallow diametric aspect, an internal frame structure holding these lower and upper surfaces together and having at the periphery location the circular wall or frame structure 3, an inner circular wall or frame structure 4, radial supporting beams 5 extending between the structure 4 and the structure 3, and an axially centrally located bearing sleeve or bearing means 6 which is firmly secured to the lower wall surface 1 and the radial beams 7 which extend from the bearing means 6 to the structure 4; a plural number of oscillative airfoils 8 each of which is formed such that it has that arcuate form whereby it may occupy an arcuate part of the arcuate oscillative airfoil means as hereinafter more particularly described, and each of which has affixed to it firmly an axle shaft which is tubular in form and provides a means whereby the airfoil is oscillative by the axle shaft, the latter being as to each designated as 9.

The circular frame structures 3 and 4 have formed in them bearings 10 in structure 3, and bearings 11 in structure 4, there being as many of each as there are airfoils 8, one bearing of each structure being radially aligned with a bearing in the other structure, each associated pair being axially in line. Each such axially aligned pair of bearings, one 10 and one 11 has oscillatively mounted in it one of the axle shafts 9, and that axle shaft with its affixed airfoil 8 is thus oscillative in its pair of bearings 10 and 11. This oscillation is a limited oscillation, limited as hereinafter described, so that the oscillation is only through such a number of degrees of rotation as will permit the airfoil to be placed alternatively in either of two positions, one of which is the position in which the airfoil is in a relatively flat position, that is so that it lies in a plane which is substantially the plane passing through the peripheral wall structure 3 of the airfoil structure 1—2 and forms a part of the radially extended plane of this structure; and another of which is the position in which the airfoil is in position inclined to that plane of the airfoil structure 1—2 and its wall 3, that inclination being by that number of degrees, say twenty to thirty degrees, which for the particular construction, is the inclination which will provide the most efficient operation as a sustentation means in rotation of the airfoils 8 as a unit with the airfoil structure 1—2—3. It should be noted here that the so-called wall structure 3 is rather a frame structure which is no deeper, transversely of airfoil structure 1—2, than is required to provide an adequate bearing structure for the airfoils 8 and to provide adequate stability of the airfoil and its axle shaft 9 for its oscillation and for its positioning in the normal or flat position aligned with airfoil structure 1—2—3, for flight as a fixed wing structure. Likewise the radially inward ends of the airfoils 8 are equally thin in depth to be approximately of the same depth at the periphery of airfoil structure 1—2—3 as that structure is at its periphery. Each airfoil 8 is thinned radially outwardly toward its outer edge radially and is also thinned toward each of its ends arcuately of the entire unit rotor somewhat as is shown in the edgewise diagrammatic view Figure 10.

Each axle shaft 9 at its radially inward end has formed on it a sector, about 120 degrees more or less, as necessary, of a worm wheel, this worm wheel sector being designated 12 and it also has formed on it in the same plane transversely of the axle shaft, a limit stop 13, arcuate in form, and the worm wheel sector 12 of each axle shaft is in permanent engagement with a smaller diameter worm 14 on small shaft 15 and each of the latter has fixed on it a bevel gear 16, each of which is in engagement with its associated small bevel gear 17, each of the latter being fixed on the armature shaft 18 of an associated electric motor 19 which is mounted interiorly of the airfoil structure 1—2—3 and affixed by its field structure by bracket 20 to that airfoil structure. An electric motor is here shown as the actuating motor means for the axle shaft 9 (one for each) as that type is a readily actuated and illustrated motor means, but it is contemplated that this motor means may be of any type which is commonly used for control actuation of any means such as airfoils, such as hydraulic motor means or air motor means. There is associated with each axle shaft 9 and its limit stop 13, a pair of fixed stops 21, the latter being shown in Figure 4 as broken away but being bracketed in any manner to the adjacent frame structure 3, radially inwardly of the latter, and so that they will form, in the manner hereinafter described, stops against which the associated limit stop 13 abuts at the end of either of its directions of oscillation, to thereby stop the associated airfoil 8 in either of its positions, as above set out.

Figure 6:
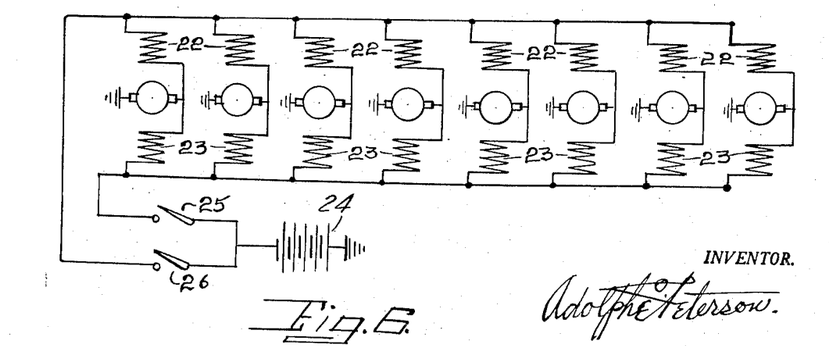
Figure 6 is a diagram showing the control and supply of electric current for the control motors.

The plural number of electric motors 19, eight in all, are connected with an electric supply and control means as diagrammatically illustrated in Figure 6 and this control is such that each motor field coil 22 for one direction of rotation, or each motor field coil 23 for the other direction of rotation are so connected in the circuit from electric supply source 24 (battery or otherwise) by one or the other of the control switches 25 or 26, so that, at the option of the pilot or manual operator, all motors 19 will have rotation of their armatures and shafts in one direction to procure one of the stated positions of airfoils 8, or so that all motors 19 will have rotation of their armatures and shafts in the opposite direction to procure the other alternative positions, as above stated. Each motor 19 has the pair of fields or field coils 22 and 23.

Each axle shaft 9 is, as appears in Figure 1, tubular and provides an internal conduit 27 which is open at 28 to the interior space of the airfoil structure 1—2 within frame or wall structure 4, so that air under rather low pressure may be received into the conduit 27 from that space, and each said conduit 27 at its opposite end (formed in the airfoil 8) is open into the associated pressure chamber 29 of a propulsion jet unit D, each airfoil 8 having one such jet unit D affixed at its radially outward edge and in the same plane as the airfoil 8 or very close to that plane. Thus each pressure chamber 29 may receive air, under conditions as hereinafter described, from the space designated S, and that air will be passed by its conduit 27 to pressure chamber 29 and will, after such combustion as there may be, be expelled as combustion products through the discharge outlet 30 of the jet unit D.

Each jet unit D is supplied with fuel for combustion, subject to control as hereinafter described, by a metering nozzle 31 associated, and each such nozzle by its fuel conduit 32 receives fuel from a common annular ring conduit 33 and the latter receives fuel from a supply means by way of a fuel pipe 34, from which fuel is passed into a fuel housing 35 which latter is rotatable on the upper end of the pipe 34, so that the ring conduit 33 and housing 35 and pipe 36 from housing 35 to ring conduit 33, may rotate as a unit on the upper end of the pipe 34, and yet receive fuel from pipe 34 which is a relatively static pipe. The pipe 34 may receive fuel from fuel pump 37 when the valve 38 permits flow of fuel from supply pipe 39. The valve 38 is a manually controlled valve, controlled directly by its valve handle shown or by any form of remote control means such as are now well known, and may be used.

Each propulsion jet unit D has a ram-jet tube 40 through which air from atmosphere may flow from its mouth 41 and to its discharge jet 42, the pressure discharge discharging into the stream intermediately of the flow from mouth 41 to discharge 42, in the manner of ram-jets. Spark plugs 43, two in each unit D provide for ignition. The current for ignition is provided by any current conductors and the stationary contact brush 44 and ring contact 45. The contact brush 44 is relatively stationary with airfoil structure 1—2—3 being fixed therein.

The structure 1—2—3—4 with all its oscillatively mounted airfoils 8 is rotatable by means of its bearing 6, on a rotor mounting pylon or bearing mounting 46 which has the upper flange 47 against which bearing 6 thrusts upwardly by means of ball bearing means 48. Other ball bearing means 49 provides additional non-frictional mounting for the rotor unit on its mounting 46. The latter has formed on its lower end the fixture structure 50 by which the pylon or mounting 46 is attached to and fixed on an aircraft fuselage generally designated as F, a part thereof being shown in Figure 1. The lower end of the bearing 6 of the rotor unit has formed on it the brake drum 51, and there is in association therewith, but not normally engaged in rotative condition, brake shoes 52 which are pivotally mounted by pivot means 53 on structure 50 and these shoes may be engaged by hydraulic engaging means generally designated as 54 this having the commonly known form of hydraulic engaging means and this means is supplied by any type of fluid supply and control means shown merely by the pipe 55, it being contemplated that there may be any manual control in connection therewith (not shown).

The bearing mounting 46 is tubular in form and has a conduit 56 axially of it and this conduit 56 is at its top open at 57 and thereby there may be free passage of air from the conduit 56 to the space S. From the space S the air will have no egress except by way of the conduits in the axle shafts 9 as previously described, since the space S is enclosed by the top surface wall 2, the lower surface 1, and the frame structure 4 which in this case must be a continuous wall preventing air passage outwardly. The packing 58 prevents loss of air around the bearing mounting 46. The latter at its lower end is closed by cap 59, but at that end there is a pipe 60 delivering into the conduit 56, as controlled by a hand valve 61 (or remote control valve in lieu thereof), from the pipe 62 which latter is a pipe connected at one end with the air compressor discharge of one turbine 63 and connected at its opposite end to a turbine 64 (shown in Figure 8). The pipe 62 is connected with the turbine air compressors in such way, as is common in turbines, that air may be received under a pressure of say any pressure from twenty five pounds to say as much as ninety pounds, more or less, depending on the construction and need for air in any construction.

The fuel pump 37 is driven by its shaft 65 by the turbine 63, or any other means in lieu thereof. The fuel supply to the turbines 63, 64, is not specifically shown but this supply is contemplated to be such as is commonly provided in combustion gas turbines, and these turbines are such as commonly known and are capable of supplying thrust for propulsion of the aircraft in flight by the jet expulsion from its rearward end, as is common in turbines. The turbines are so constructed that they not only provide the thrust for normal translational flight, but so that they will also be capable of supplying the needed air under pressure for delivery to the propulsion jet means D.

Having, as above, described the specific construction of one unit such as my device, the operation of this unit, in general is now described. Assuming that an aircraft on which the unit is placed, is on ground and that it is desired to take off, the turbines 63, 64, are placed in operation in the usual way, as turbines are started, and these turbines will then supply air under pressure to the conduit 56 and thereby to the space S, if the hand valve 61 is opened, and it is opened when sufficient speed of the turbines is attained. The hand valve 38 should then be opened so that fuel is supplied under pressure to the metering nozzles 31. The spark plugs in the jets D will be supplied with current for ignition, as stated. It is assumed that the airfoils 8 are in the flat or aligned and so-called inactive positions, rotationally. This may be the condition for the start so that the power propulsion of jets D will more quickly give speed of rotation. Air under pressure now passes from space S through the axle shafts 9 to the jets D and fuel is ejected from nozzles 31 and is mixed with the air from space S, just prior to entry to the jets D, and combustion occurs. The pressure of the air from space S, and the heat of the combustion causes ejection of combustion products from the jets D, and this ejection is, as to all jets D in the same direction circumferentially and rotationally of the rotor. Thus this ejection will procure propulsion of the rotor means as a unit, including the airfoil structure 1, 2, 3, 4, and the airfoils 8, and all the fuel conduits which are located between walls 1, 2, and this entire rotor structure rotates by means of bearing 6 on the bearing mounting or pylon 46 and the fuel housing 35 also rotates on the upper end of the fuel conduit 34, and the contact brush 44 and also contact brushes 66 rotate on the contact rings 67. These contact brushes 66 will supply electric current from the rings 67, according to the diagrammatic illustration in Figure 6, and according to the control by the switches 25—26.

When the airfoil structure has attained as sufficient speed, the switch procuring movement of the airfoils 8 into their positions of inclination to the plane of the rotor airfoil structure 1—2, is closed to permit flow of current to the field coils providing for that movement to the positions of inclination. All the airfoils 8 are then moved into the positions so that they are stationed relatively according to the diagram in Figure 11, and thereupon they each will act as airfoils in rotation of the rotor structure on its mounting 46, and this will provide vertical thrust for the aircraft on which the rotor is affixed, and if the air and fuel supply is now increased to a sufficient extent, the aircraft will rise from the ground, and take off. When the aircraft attains a sufficient elevation in the air, for safe conversion, the pilot by means of the switches, as described, then closes the switch providing for closing of the airfoils 8, that is movement to the flat, aligned position (the other switch being open), and then the airfoils 8 will move to the closed, aligned positions, as illustrated by the diagram Figure 10, and they will then become a part of the airfoil structure for fixed wing flight. Prior to such closing of the airfoils, to the aligned positions, the turbines 64, 63, must have imparted a sufficient horizontal flight speed to the aircraft, so that there is sufficient speed of travel for sustentation as a fixed wing aircraft, the turbine providing this propulsion by their jet thrust, as in turbine jets.

Figure 2:
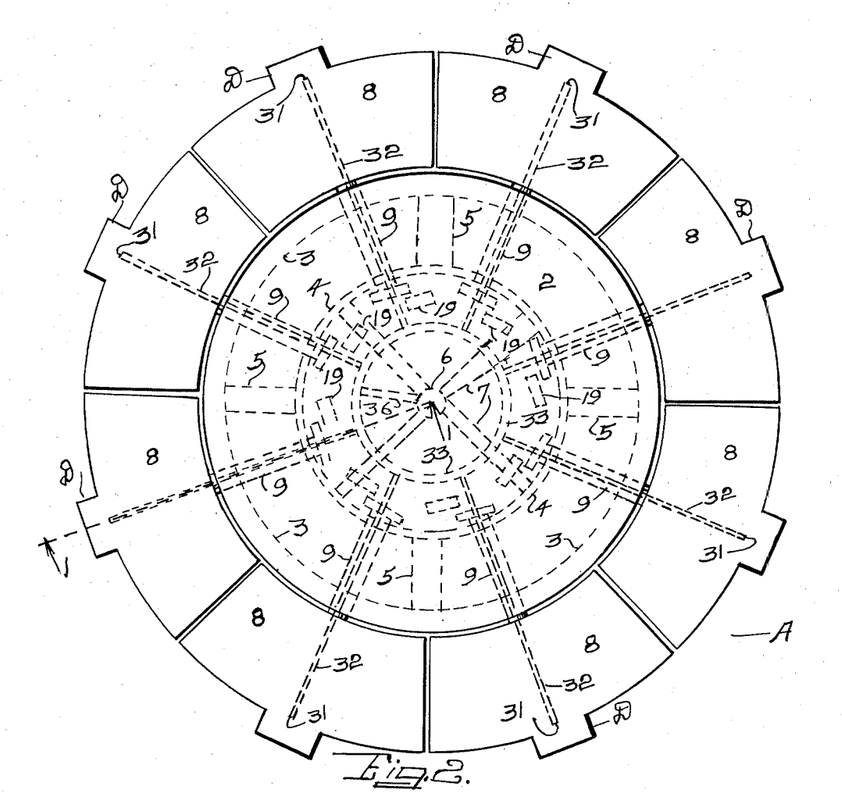
Figure 2 is a plan view of this one unit of my device, on a scale which is approximately one-third that of Figure 1, an associated fuselage being not illustrated in this figure which is only the plan view of one unit.
Figure 10:
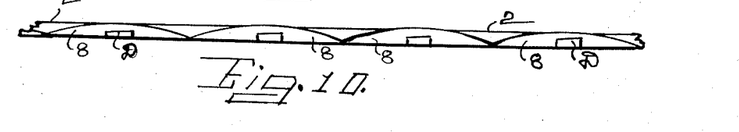
Figures 10 and 11 are views of a few of the oscillative air foil sections of a unit, extended in line as if they were in a straight line, these being placed arcuately of the central airfoil in the unit illustrated, these figures being thus shown, to show such sections in the inactive or flattened status, in Figure 10, and in the rotative sustentation position, in Figure 11.

In such horizontal normal flight, the airfoil structure 1, 2, and the airfoils 8 are all so aligned, as illustrated in Figure 10, and as in Figure 2, that all this structure acts as one fixed airfoil wing in flight, and the inclination of the axis of the bearing mounting 46, as illustrated in Figure 1 is such that the airfoil structure, as a fixed wing, has that inclination to the horizontal flight as necessary for such fixed wing sustentation. The brake means 52—54 may now be applied to brake the structure 1, 2, 8, against rotation, although such brake means may be eliminated or may not be used as desired.

Figure 11:
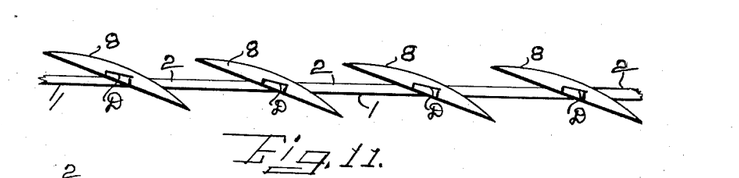

At the end of a desired flight, the pilot will cause the turbines to slow the aircraft speed, somewhat, and will then by the switch means, cause the electric motors 19 to move the airfoils 8 to the inclined positions for airfoil sustentation in rotation, and they will take the relative positions, as illustrated in Figure 11, and the pilot will then again cause air under pressure and fuel to flow to the jets D, he having discontinued this flow when the horizontal travel was assumed. Rotation of the rotor means, as before described, then provides sustentation for vertical descent to any landing field or location.

In the rotation of the rotor unit, for sustentation thereby, and climb or descent, the air under pressure from space S and the combustion of fuel injected to that air, in each jet D, provides thrust propulsion for the rotor, in a major part by the combustion of fuel and the air under pressure from space S, but that thrust is supplemented by the flow of the atmospheric air entering the mouths 41 of the jets D, and this supplemental air provides air for combustion of fuel in addition to that provided by the air under pressure, and the fuel supply may be proportioned by the control of the fuel pump and its capacity to provide for that supplemental combustion. It should be noted, however, that the jets D may be constructed to provide thrust solely by the expulsion of the combustion products of the air under pressure from space S and the fuel supplied thereto, the surrounding channel in the ram jet casing 40 and the mouth 41, thereto, being then eliminated, from the construction. Preferably both means of supply of air for combustion to jets D, would be used.

Figure 9:
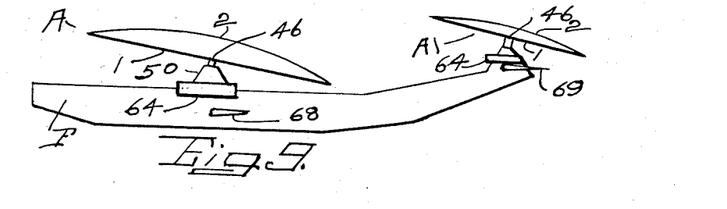
Figure 12:
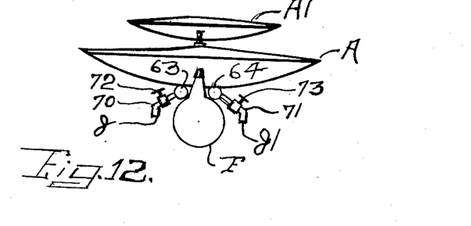
Figure 12 is a frontal view of this aircraft.

Referring now to Figures 8 and 9, these figures and Figure 12, show one type of mounting of the rotor units on an aircraft, there being shown in this application, two rotor units such as have been described, one main and large rotor unit A and another rotor unit, which is smaller, designated A1, the latter being mounted on the extreme rearward end of the fuselage F. Each unit A and A1 has all the elements and units such as were above described in connection with the one rotor unit, and each has an associated pair of turbines, 63 and 64, and each has the valve control means which was described. Each rotor unit A and A1 is mounted by its bearing mounting 46, so that the axis of rotation of the rotor of the unit is inclined as shown in Figure 1, with the top of the axis rearwardly of the lower end of the axis, so that the airfoil structure 1—2—3—4, and 8 is inclined to the horizontal direction of horizontal normal flight, so that the lower surface of the lower wall 1 of each unit A, A1, generally presents the same inclined surface against which air flows in flight, as in fixed wing aircraft, and so that the plane of the airfoil structure, that is the plane passing through the peripheral extremity of the rotor structure is inclined to the direction of horizontal flight, as in fixed wing aircraft generally, the inclination provided in any construction, being that which will provide the most efficient air flow for sustentation, as may be necessary, for relatively high speed horizontal flight. The unit A1 may provide the surface for stabilization in fixed wing flight, and will also provide means for stabilization of the fuselage F for rotor sustained flight, the pilot being enabled to increase or diminish the lifting thrust of the rotors by his control of the air and fuel supply to the jets D of each rotor, especially that of rotor unit A1. The fuselage F has at its sides, front ailerons 68 and rear ailerons 69, two in front and two in rear, and these are the usual type of variable inclination airfoils, provided with any type of controls therefor, as in aircraft generally, such control means being not shown, since it is of any known type.

The aircraft may also be provided with a pair of downwardly pointed air pressure jets J and J1, which may receive air from the turbines associated, by pipes 70 and 71, remote control valves 72, 73, being provided to enable the pilot to cause air under pressure to be ejected downwardly from either jet J or J1 one on one lateral side and the other on the other lateral side of the fuselage F, this providing for stabilization laterally of the aircraft, especially in rotor unit sustained flight, as in climbing, hovering, or descent. Any such stabilizing means for the rotor rotation sustained flight, may be provided. It should be noted that the jets D of each rotor unit may be formed in such a manner that the air flow externally thereof and to the airfoils 8, is not obstructed appreciably by these jets D. The rotation of the structure 1—2—8, provides a gyroscopic effect so that other stabilizing means for the rotational sustentation, need be only of relatively light power for such stabilizing.

The metering nozzles 31 each having a metering aperture 31a, and each of these in one rotor unit are of exactly the same flow capacity under any particular fuel pressure, so that fuel supply to the units D of all airfoils 8 is measured in flow in exactly the same quantity, so that thus combustion and propulsion effect in units D is equal in thrust.

The propulsion jets D may be, by the control indicated, supplied with a larger proportion of air under pressure and fuel for combustion for the rotational sustentation for climb and hovering and descent. When the pilot desires to convert the aircraft to horizontal translational flight, at speed, he may reduce the proportion of air under pressure supplied to units D, while maintaining relatively large fuel supply thereto, and the units D may then receive a larger proportion of air from atmosphere, by mouths 41, for combustion and propulsive effect, and thereby the propulsive thrust of the turbines 63, 64, for forward flight, is not diminished and propulsion effect is increased on the aircraft, so that thereafter conversion to fixed wing flight, solely, is more readily accomplished.

The drawings illustrate the elements and units, in such manner, as chiefly to show, the relative operation, and it is contemplated that any elements or units, would be manufactured in such sections and parts and thereupon assembled, to form the devices indicated, as would be convenient and necessary for any particular construction.

The units D may be located and affixed to airfoils 8 to be, as to their axes, exactly parallel to the plane of the structure 1—2—3, and when airfoils 8 are in the inclined positions, these units D would then direct gases rearwardly, generally, but at a slight angle say twenty to thirty degrees downwardly relative to the plane of the structure, propulsion occurring then rearwardly but slightly downwardly. The units D may, however, be mounted on the airfoils 8, so that they direct gas exactly rearwardly in rotation, that is in the plane of the rotation, and this may be accomplished, by inclining the units D at a slight angle to the airfoils, as is diagrammatically shown in Figures 10 and 11, but so that in any case, the units D do not direct the expelled gases at any angle which would cause the propulsion to be other than directly in the plane of rotation, or at a slightly downward angle relatively thereto.

Figures 13, 14:
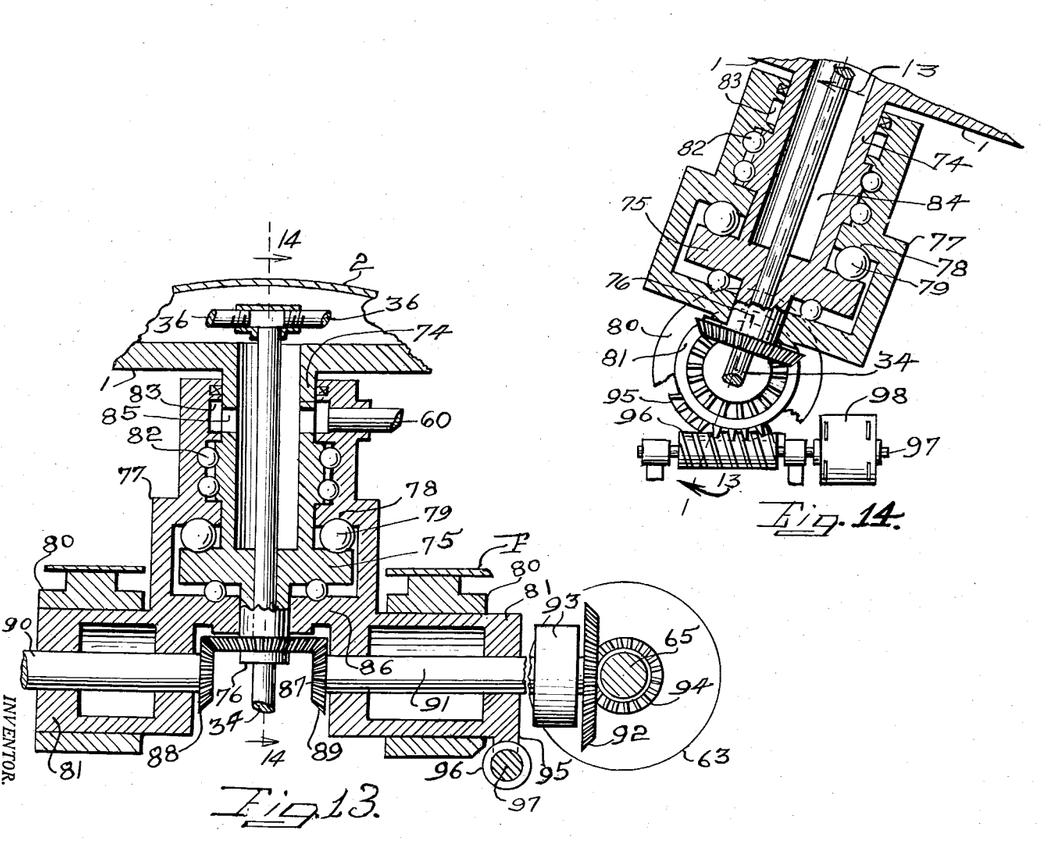
Figure 13 is a section through the axis of the rotor unit and on line 13—13 of Figure 14.
Figure 14 is a view in section at right angles to the section of Figure 13 and on the 14—14 of Figure 13.

Referring now to Figures 13 and 14, which show the modified detailed construction, this modification is illustrated, in detail only, to show a modified form of the mounting bearing or pylon mounting in combination with a modified form of mounting of the airfoil structure therein, and also to show a somewhat modified form of drive means for rotor means, which modified drive may be used with the propulsion jet means D, as in the first described form, for the propulsion of the rotor means for the rotor sustentation of the aircraft. The elements designated by reference numerals 1 through 43 in Figures 1–12 are employed without change in the modification of Figures 13, 14 and the electric contact means and brush means and control means, are substantially the same, being placed in such manner as to permit the use and distribution of the control current and ignition current, in the same manner, and such means are not therefore specifically shown in Figures 13, 14, except that portions of the rotor structure 1 and 2, are shown with the modified bearing means, the other parts of that structure 1, 2, being broken away.

In this form, the lower wall 1 of the rotor structure, and its framework, as in the first form, has attached firmly thereto a tubular post or axle 74 which is exactly axially of the rotor structure, depending downwardly therefrom as its axis of rotation, and this tubular axle 74 has on its lower end a bearing flange 75 and also an axially placed downwardly depending short tubular shaft 76. The tubular axle 74 is mounted rotatably within a tubular bearing pylon or bearing mounting 77 which substantially encloses or surrounds the axle 74 and provides also a downwardly facing bearing 78, annular in form, against which, with intermediate ball bearing means or other frictionless bearing means 79, the bearing flange 75 of axle 74 bears in rotation for upward sustentation of the fuselage structure F, which latter is here shown only in fragmentary manner. The fuselage structure F has attached to it a pair of pylon mounting bearings 80 in which pair there are oscillatively located a pair of plyon axles 81, the latter being rigidly formed with and as a part of the pylon or bearing mounting 77, so that by these axles 81 the mounting 77 is oscillative on an axis which is axially of the pylon axles 81, and which axis is a horizontal axis placed transversely of the fuselage F and transversely of the direction of horizontal flight of the aircraft fuselage F, that is at right angles to that direction. By this axle 81, and its bearings 80, the pylon bearing and its internally rotatively mounted rotor axle 74 and accordingly, the structure 1, 2, 3, 4, 8, are oscillative as a unit on the axis of the pylon axles 81, which is a horizontal axis. Thus the rotor structure is oscillative to be changed as to its angle of incidence for translational non-rotative flight, and also to an angle which may be horizontal and parallel with the general longitudinal axis or location of the fuselage structure F for horizontal carriage of its load within it, in rotative sustentation. The pylon mounting 77 also has ball bearing means 82 which assist in locating the axle 74 for its rotative action.

The pylon mounting 77 also has formed within an annular chamber 83 by which the air under pressure is conveyed to the conduit 84 in axle 74 through ports 85, from the air pressure conduit 60 (the latter being as in the first form connected with the turbines to receive air under pressure). The short shaft 76, at its lower end, beneath the bearing 86 of pylon mounting 77, has attached to it, a bevel gear 87 with which two bevel gears 88, 89, are in permanent engagement on opposite sides. The gears 88, 89 are fixed, one on each drive shaft 90, 91, and each of the latter are in driven engagement with a large bevel gear 92 (one only being shown), with however a clutch means 93 (one only being shown) intermediately of the bevel gear 92 and the gears 88, 89. The bevel gears 92 are each in engagement with one smaller bevel gear 94 (one only being shown), and the gears 94 are each fixed on one turbine shaft 65 (one only being shown), so that the turbine 63 or 64 may drive the short shaft 76 and thereby drive axle 74 and the rotor 1, 2, 3, 4, 8. The turbine shafts 65 (one shown) may be operated in reverse rotational directions in order that each will drive the shafts 76 and 74, and the rotor 1, 2, 3, 4, 8, in the same rotational direction.

One of the pylon axles 81 has fixed on its end a sector 95 of a worm wheel and a small worm 96 is in engagement therewith, and the worm 96 is on an armature shaft 97 of electric motor 98, so that the motor 98, may under any control for reversing it, drive the worm 96 in either direction and thus oscillate the pylon axles 81 on their axis of oscillation, to thus also give the rotor its different angles of incidence.

There is thus shown a means for driving of the rotor 1, 2, 3, 4, 8, by means of a shaft drive between it and the turbines 63, 64, but this means of imparting propulsive rotation to the rotor, is supplemented, in this form by the means which is shown in the first form, so that in this form there are the two forms of drive to the rotor. It is contemplated that the jet drive D may be eliminated in this form if that is found desirable in any particular construction. The conduit 60 may in this form be any type of flexible conduit placed as shown, and between the pylon mounting 77 and the turbine compressor means, this flexible conduit permitting oscillation of the mounting 77, and not interfering therewith. The oscillation of the mounting 77 is a limited oscillation, being only in such a degree as to permit of the placing of the rotor in its different angles of incidence, one for fixed wing forward translational flight, and another position for rotation sustained climb or descent or hovering.

While I have shown detailed devices and combinations of devices in the illustration of my invention, I contemplate that other detailed devices and combinations of devices may be used in the realization of my invention, without departing from the principles thereof and the claimed invention.

What I claim is:

1. In an aircraft: an airfoil rotor unit, comprising, first, a principal airfoil section circular in periphery, having a main bearing means for rotation mounting, having within the airfoil section a frame structure and having airfoil pivot means fixed to said frame structure and spaced substantially equi-distantly about the said frame structure; and second, a supplemental airfoil means circumferentially of the said principal airfoil section and including a plural number of airfoil arcuate elements of substantially similar arcuate form and area and spaced about the circumference of the principal airfoil section, each having a pivot means complementary to one pivot means of said frame structure and operable together therewith whereby each arcuate element is mounted oscillatively so that the arcuate element is held in relative position with its axis of oscillation substantially in the same plane as the periphery of the said principal airfoil section, and so that it is oscillative to either of alternative positions one in which the airfoil arcuate element lies substantially in the said plane of said periphery substantially aligned therewith at zero angle and another position in which the airfoil arcuate element is placed so that the airfoil arcuate element has its arcuate chord stationed at an angle to said plane and with aerodynamic incidence to said plane, each of the said plural number of airfoil arcuate elements having a shape such that in aligned positions at zero angle of incidence the said airfoil arcuate elements form a substantially continuous circumferential airfoil surface about the said principal airfoil section and in the plane of the periphery of said principal airfoil section; and third, a pylon mounting fixed on an associated aircraft structure and by which the main bearing means of said principal airfoil section is rotatively mounted by said pylon mounting on said associated aircraft structure so that the said principal airfoil section and its supplemental airfoil means may be rotated as a unit; and fourth, a motor means for oscillation movement of said arcuate elements by their said individual pivot means in unison to the one condition all aligned with said plane at zero angle thereto and alternatively in unison to another condition each at an angle to said plane with aerodynamic incidence thereto; and fifth, a rotor propulsion means to impart rotative movement on said pylon mounting to said rotor unit inclusive of the principal airfoil section and supplemental airfoil means inclusive of said arcuate elements.

2. The means as specified in claim 1, and in combination: the said rotor propulsion means including, a plural number of jet discharge units spaced about said supplemental airfoil means and mounted each at one location circumferentially of said principal airfoil section, a means for delivering fuel to each said jet discharge unit, a means for delivery of air under pressure to each said jet discharge unit and means for ignition at each jet discharge unit, each said jet discharge unit discharging in the same direction rotationally of said rotor unit.

3. The means as specified in claim 1, and in combination; the said rotor propulsion means including, a plural number of jet discharge units spaced about said rotor unit and mounted each at one location circumferentially of said rotor unit and thereon, a means for delivery of fuel to each said jet discharge unit, a means for delivery of air for combustion to each said jet discharge unit and for combustion with fuel and discharge as combustion products, and means for ignition at each jet discharge unit, each said jet discharge unit discharging in the same direction rotationally of said rotor unit.

4. The means as specified in claim 1, and in combination; the said rotor propulsion means including, a plural number of jet discharge units spaced about said rotor unit and mounted each at one location circumferentially of said rotor unit and thereon, a means for delivery of fuel to each said jet discharge unit, a means for delivery of air under pressure to each said discharge unit, a means for reception of atmospheric air for each said jet discharge unit in its rotation, means for ignition at each jet discharge unit, each said jet discharge unit discharging in the same direction rotationally of said rotor unit.

5. In an aircraft: an airfoil rotor unit, comprising, first; a principal airfoil section circular in periphery, having a main bearing means for rotation mounting, having within the airfoil section a frame structure and having airfoil pivot means fixed to said frame structure and spaced substantially equi-distantly about the said frame structure; and second, a supplemental airfoil means circumferentially of the said principal airfoil section and including a plural number of airfoil arcuate elements of substantially similar arcuate form and area and spaced about the circumference of the principal airfoil section, and having each a pivot means complementary to one pivot means of said frame structure and operable together therewith whereby each arcuate element is mounted oscillatively so that the arcuate element is held in relative position with its axis of oscillation substantially in the same plane as the periphery of the said principal airfoil section, and so that it is oscillative to either of alternative positions one in which the airfoil arcuate element lies substantially in the said plane of said periphery substantially aligned therewith at zero angle and another position in which the airfoil arcuate element is placed so that the airfoil arcuate element has its arcuate chord stationed at an angle to said plane and with aerodynamic incidence to said plane; and third, a pylon mounting fixed on an associated aircraft structure and by which the first said bearing means of said principal airfoil section is rotatively mounted by said pylon mounting so that the said principal airfoil section and its supplemental airfoil may be rotated as a unit; and fourth, a motor means for oscillation movement of said arcuate elements by their said individual pivot means to the one condition all aligned with said plane at zero angle thereto and alternatively to another condition each at an angle to said plane with aerodynamic incidence thereto; and fifth, a rotor propulsion means to impart rotative movement on said pylon mounting to said rotor unit inclusive of the principal airfoil section and supplemental airfoil means inclusive of said arcuate elements, the said rotor propulsion means including an engine means mounted in association with said pylon mounting and having a driving connection between the rotary shaft of the engine and said rotor unit to impart driving torque for rotation of the said rotor unit on said pylon mounting.

6. In an aircraft: an airfoil rotor unit, comprising, first; a principal airfoil section circular in periphery, having a main bearing means for rotation mounting, having within the airfoil section a frame structure and having airfoil pivot means fixed to said frame structure and spaced substantially equi-distantly about the said frame structure; and second, a supplemental airfoil means circumferentially of the said principal airfoil section and including a plural number of airfoil arcuate elements of substantially similar arcuate form and area and spaced about the circumference of the principal airfoil section, and having each a pivot means complementary to one pivot means of said frame structure and operable together therewith whereby each arcuate element is mounted oscillatively so that the arcuate element is held in relative position with its axis of oscillation substantially in the same plane as the periphery of the said principal airfoil section, and so that it is oscillative to either of alternative positions one in which the airfoil arcuate element lies substantially in the said plane of said periphery substantially aligned therewith at zero angle and another position in which the airfoil arcuate element is placed so that the airfoil arcuate element has its arcuate chord stationed at an angle in said plane and with aerodynamic incidence to said plane; and third, a pylon mounting fixed on an associated aircraft structure and by which the first said bearing means of said principal airfoil section is rotatively mounted by said pylon mounting so that the said principal airfoil section and its supplemental airfoil means may be rotated as a unit; and fourth, a motor means for oscillation movement of said arcuate elements by the said individual pivot means to the one condition all aligned with said plane at zero angle thereto and alternatively to another position each at an angle to said plane with aerodynamic incidence thereto; and fifth, a rotor propulsion means to impart rotative movement on said pylon mounting to said rotor unit inclusive of the principal airfoil section and supplemental airfoil means inclusive of said arcuate elements, the said rotor propulsion means including an engine means mounted in association with said pylon mounting and having a driving connection with interposed controllable clutching means between the rotary shaft of the engine and said rotor unit to impart driving torque for rotation of the said rotor unit, on said pylon mounting.

7. The means as specified in claim 1, and in combination: the said motor means for oscillation of said arcuate elements as more particularly specified being motor units in actuable interconnection therewith and means for control of the said motor units to enable motor actuated oscillative movement in unison for the one condition and motor actuated oscillative movement in unison for the other condition.

8. The means as specified in claim 1, and in combination: a means for translational propulsion of the associated aircraft mounted by said pylon mounting and by said rotor unit.

9. The means as specified in claim 1, and in combination: means for translational propulsion of the associated aircraft mounted by said pylon mounting and by said rotor unit, and means for stabilization of the said associated aircraft in rotor sustentation of the said associated aircraft or in translational propulsion of the said associated aircraft.

10. In an aircraft: an aircraft fuselage structure; an airfoil rotor unit, comprising; a principal airfoil section circular in periphery and of relatively thin depth in proportion to the circumferentially enclosed area of the section, a main bearing means for rotation mounting of the said principal airfoil section, a frame structure within the said principal airfoil section; a supplemental airfoil means circumferentially of the said principal airfoil section and including a plural number of airfoil arcuate elements of substantially similar arcuate form and area and spaced about the circumference of the principal airfoil section; oscillation pivot means and motor actuation means for all said arcuate elements to hold each said arcuate element circumferentially of the principal airfoil section and provide for oscillative movement in unison of all said arcuate elements to alternate positions in one of which each arcuate element lies substantially in the plane of the periphery of said principal airfoil section at zero angle of incidence to said plane and in the other of which each arcuate element is stationed at an angle of incidence to said plane for sustentation in rotation of the rotor unit; each of the said plural number of airfoil arcuate elements having a shape such that in aligned positions at zero angle of incidence the said airfoil arcuate elements form a substantially continuous circumferential airfoil surface about the said principal airfoil section and in the plane of the periphery of said principal airfoil section; a pylon mounting fixed on the aircraft fuselage structure and by which the first named main bearing means of said principal airfoil section is rotatively mounted by said pylon mounting so that the said principal airfoil section and its said supplemental airfoil means may be rotated as a unit and a rotor propulsion means to impart rotative movement on said pylon mounting to said rotor unit inclusive of the said principal airfoil section and the said supplemental airfoil means; and means for translational propulsion of the aircraft fuselage structure and the airfoil rotor unit mounted by said pylon mounting.

11. The means as specified in claim 10, and in combination: the said rotor propulsion means including, a plural number of jet discharge units spaced about said rotor unit radially outwardly thereof and mounted each at one location circumferentially of said rotor unit, a means for delivering fuel to each said jet discharge unit, a means for delivery of air under pressure to each said jet discharge unit and means for ignition at each jet discharge unit, each said jet discharge unit discharging in the same direction rotationally of said rotor unit for propulsion.

12. The means as specified in claim 10, the said motor actuation means for all said arcuate elements being more specifically described as adjusting motor means having actuating interconnection with each said arcuate element and by which the arcuate elements may be actuated on the oscillation pivot means to the positions of incidence to provide sustentation of the associated aircraft in rotation of the rotor unit on the pylon mounting or alternatively to the positions of zero angle of incidence to the said plane.

13. The means as specified in claim 10, the said rotor propulsion means being more specifically described as a plural number of jet discharge units spaced about said rotor unit and mounted each at one location circumferentially of said rotor unit and thereon, a means for delivery of fuel to each said discharge jet unit, a means for passage of air for combustion to each said jet discharge unit, and for combustion with fuel and discharge as combustion products, and means for ignition at each jet discharge unit, each said jet discharge unit discharging in the same direction rotationally of said rotor unit.

14. In an aircraft: an airfoil rotor unit, comprising; a principal airfoil section circular in periphery and of relatively thin depth in proportion to the circumferentially enclosed area of the section, a main bearing means for rotation mounting of the said principal airfoil section, a frame structure within the said principal airfoil section; a supplemental airfoil means circumferentially of the said principal airfoil section and including a plural number of airfoil arcuate elements of substantially similar arcuate form and area and spaced about the circumference of the principal airfoil section; oscillation means for each said arcuate element to hold each said arcuate element circumferentially of the principal airfoil section and provide for oscillative movement of each said arcuate element to alternate positions in one of which each arcuate element lies substantially in the plane of the periphery of said principal airfoil section at zero angle of incidence to said plane and in the other of which each arcuate element is stationed at an angle of incidence to said plane for sustentation in rotation of the rotor unit; a pylon mounting fixed on an associated aircraft structure and by which the first named main bearing means of said principal airfoil section is rotatively mounted by said pylon mounting so that the said principal airfoil section and its supplemental airfoil means may be rotated as a unit and a rotor propulsion means to impart rotative movement on said pylon mounting to said rotor unit inclusive of the said principal airfoil section and the said supplemental airfoil means, the said rotor propulsion means including an engine means mounted in association with said pylon mounting and having a driving connection between the rotary shaft of the engine and said rotor unit to impart driving torque for rotation of the said rotor unit on said pylon mounting.

15. In an aircraft: an airfoil rotor unit, comprising; a principal airfoil section circular in periphery and of relatively thin depth in proportion to the circumferentially enclosed area of the section, a main bearing means for rotation mounting of the said principal airfoil section, a frame structure within the said principal airfoil section; a supplemental airfoil means circumferentially of the said principal airfoil section and including a plural number of airfoil arcuate elements of substantially similar arcuate form and area and spaced about the circumference of the principal airfoil section; oscillation means for each said arcuate element to hold each said arcuate element circumferentially of the principal airfoil section and provide for oscillation movement of each said arcuate element to alternate positions in one of which each arcuate element lies substantially in the plane of the periphery of said principal airfoil section at zero angle of incidence to said plane and in the other of which each arcuate element is stationed at an angle of incidence to said plane for sustentation in rotation of the rotor unit; a pylon mounting fixed on an associated aircraft structure and by which the first named main bearing means of said principal airfoil section is rotatively mounted by said pylon mounting so that the said principal airfoil section and its said supplemental airfoil means may be rotated as a unit and a rotor propulsion means to impart rotative movement on said pylon mounting to said rotor unit inclusive of the said principal airfoil section and the said supplemental airfoil means, the said rotor propulsion means including an engine means mounted in association with said pylon mounting and having a driving connection with interposed clutching means between the rotary shaft of the engine means and said rotor unit to impart driving torque for rotation of the said rotor unit on said pylon mounting.

16. The means as specified in claim 10, the said motor actuation means for all said arcuate elements being more specifically motor means for oscillation actuation of said arcuate elements and in actuable interconnection therewith and including means for control of the said motor means to enable motor actuated selective oscillative movement for the one position or the other position of the said arcuate elements.

17. The means as specified in claim 10, and in combination: means for stabilization of the aircraft in rotor sustentation of the aircraft or in translational propulsion of the aircraft.

18. An aircraft having a fuselage and thereon a pylon mounting on which a rotor unit is rotationally mounted, the said rotor unit including a circular interior airfoil section of relatively thin depth and large area internally of the circular periphery, the said rotor unit also including a plural number of arcuate airfoil elements circumferentially of the said interior airfoil section, means for retaining the said arcuate elements in their spaced locations circumferentially of the interior airfoil section and for oscillation in unison of all said arcuate elements by the said retaining means and motor means in interconnection with said means for retaining to provide actuation motive power for said oscillation, the said oscillation providing for alternative conditions one in which all arcuate airfoil elements are similarly aligned with said interior airfoil section at zero angle of incidence thereto and one in which all the arcuate airfoil elements are similarly at an angle of incidence to the plane of said interior airfoil section for aerodynamic sustentation in rotation of the said rotor unit on said pylon mounting, and means for rotational propulsion of the said rotor unit, or alternatively translational propulsion of the aircraft.

19. The means as specified in claim 18, and in combination: the means for rotational propulsion of the rotor unit being more specifically described as a plural number of jet units mounted substantially at the radial extremity of said arcuate elements, and conduit means in arcuate elements through which air under pressure is passed to the jet units, and a pipe means passing through arcuate elements to carry fuel to the said jet units for combustion with air in the jet units, all of said jet units discharging in the same direction for rotational propulsion of the rotor unit.

20. An aircraft having a fuselage and a rotor unit as specified in claim 18, the pylon mounting on the fuselage being pivotable on a horizontal axis, and motor actuation means between the pylon mounting and the fuselage for actuation of the pylon mounting with its rotor unit by oscillation on the said horizontal axis.

21. An aircraft having a fuselage and a pair of rotor units each being as specified in claim 1, and each said rotor unit being rotatable on its pylon mounting on the aircraft fuselage.

References Cited in the file of this patent

UNITED STATES PATENTS 1,964,179   Roth _______________ June 26, 1934

FOREIGN PATENTS 470,421   Italy _______________ Apr. 7, 1952
1,018,196   France _______________ Oct. 8, 1952
1,047,657   France _______________ July 29, 1953
1,067,244   France _______________ Jan. 27, 1954